United States Patent
Jenuwine et al.

(10) Patent No.: US 7,845,710 B2
(45) Date of Patent: Dec. 7, 2010

(54) UNDERRIDE COMPATIBILITY APPARATUS FOR A VEHICLE

(75) Inventors: John G. Jenuwine, Rochester Hills, MI (US); Elizabeth L. LaRue, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 165 days.

(21) Appl. No.: 12/268,482

(22) Filed: Nov. 11, 2008

(65) Prior Publication Data
US 2010/0117385 A1 May 13, 2010

(51) Int. Cl.
B60J 7/00 (2006.01)
(52) U.S. Cl. .................. 296/187.09; 293/118
(58) Field of Classification Search ............ 296/187.09, 296/187.05, 187.03, 187.22; 293/102, 118, 293/132, 133, 120; 280/784
See application file for complete search history.

(56) References Cited

U.S. PATENT DOCUMENTS

| | | | | |
|---|---|---|---|---|
| 3,533,654 A | * | 10/1970 | Kannegieter | 280/164.1 |
| 4,247,138 A | * | 1/1981 | Child | 293/103 |
| 4,403,674 A | * | 9/1983 | Viall et al. | 293/5 |
| 4,514,002 A | * | 4/1985 | McIntosh | 293/118 |
| 4,582,351 A | * | 4/1986 | Edwards | 293/118 |
| D352,019 S | * | 11/1994 | Rivero et al. | D12/169 |
| 5,360,311 A | * | 11/1994 | Lutz et al. | 293/118 |
| 5,520,428 A | * | 5/1996 | Bell | 293/102 |
| 5,673,953 A | * | 10/1997 | Spease | 293/118 |
| 6,116,667 A | * | 9/2000 | Torcomian | 293/132 |
| 6,176,529 B1 | * | 1/2001 | Kitzmiller et al. | 293/102 |
| 7,086,674 B2 | * | 8/2006 | Goertz | 293/133 |
| 2001/0030431 A1 | * | 10/2001 | Killday | 293/118 |

* cited by examiner

*Primary Examiner*—Kiran B. Patel
(74) *Attorney, Agent, or Firm*—Quinn Law Group, PLLC

(57) ABSTRACT

An underride compatibility apparatus is provided for a vehicle structure. The apparatus includes a frame arranged to support the vehicle structure. The frame includes an energy absorption portion arranged for absorption of impact energy. The apparatus also includes a beam arranged substantially transverse to the vehicle structure, below the frame, and remote from the energy absorption portion. The apparatus also includes a flexible member configured to carry a tensile load, but not a substantial compressive load. The flexible member distributes the impact energy between the energy absorption portion and the beam when the member is loaded in tension during an underride impact, but does not affect the impact energy absorption of the energy absorption portion during a direct impact.

14 Claims, 4 Drawing Sheets

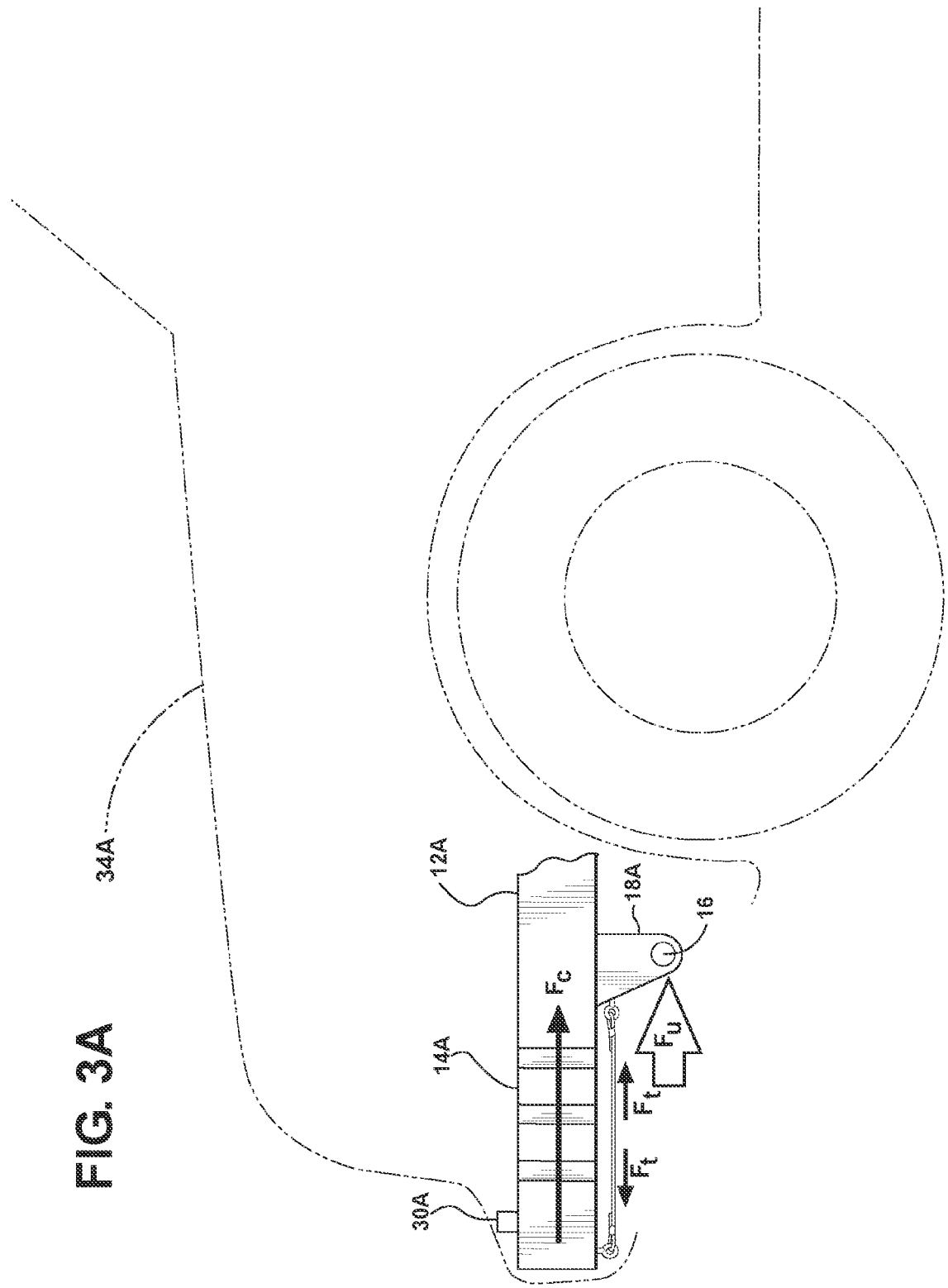

UNDERRIDE COMPATIBILITY APPARATUS FOR A VEHICLE

TECHNICAL FIELD

The invention relates to a vehicle structure for absorbing and distributing impact energy, and for preventing a vehicle of a lower stance from underriding a vehicle of a higher stance in the event of impact.

BACKGROUND OF THE INVENTION

Typically, utility vehicles, such as pick-ups and vans, have a higher stance as compared with that of typical passenger vehicles, such as sedans and wagons. Such dissimilarity in elevation may permit a passenger vehicle to underride a utility vehicle in an event the two are involved in a collision and avoid bumper to bumper contact. In response to above concerns, supplementary structures are frequently incorporated into frames of higher stance vehicles to prevent a lower stance vehicle underride.

Typically, a vehicle frame is incorporated into the vehicle structure to provide structural support and energy absorption in the event of impact. Additionally, a vehicle frame may be used to position actuation sensors for various occupant protection systems, such as air bags. Generally, actuation sensors are positioned on a structure supported by the frame, such as the vehicle's radiator support member or a section which supports the bumper. The actuation sensors typically communicate with an electronic controller programmed with a sensing algorithm calibrated to the specific frame. Ordinarily, a vehicle so equipped undergoes dedicated testing to validate frame and occupant protection system performance.

SUMMARY OF THE INVENTION

An underride compatibility apparatus for a vehicle structure is provided. The apparatus includes a frame arranged to support the vehicle structure that has an energy absorption portion arranged for absorption of impact energy. The beam is arranged substantially transverse to the vehicle structure, below the frame, and remote from the energy absorption portion. The apparatus additionally includes a flexible member configured to carry a tensile load, but not a substantial compressive load. The flexible member has a first end arranged on the frame and a second end arranged on the beam, wherein the energy absorption portion is arranged between the first end and the second end. Furthermore, the flexible member is configured sufficiently with respect to the frame for distributing the impact energy between the energy absorption portion and the beam when the flexible member is loaded in tension during an underride impact on the vehicle. The flexible member is likewise configured to not affect the impact energy absorption of the energy absorption portion during a direct impact on the vehicle. The flexible member may also be arranged to reduce displacement of the beam during the underride impact on the vehicle.

The first end of the flexible member may be arranged above its second end, wherein the flexible member is configured at an angle with respect to the frame for distributing the impact energy. The flexible member may also be arranged substantially parallel to the energy absorption portion, and positioned generally above the beam but below the frame.

The flexible member may be configured as a cable, a chain, or a strap. Furthermore, the energy absorption portion of the frame may be arranged at the front and/or at the rear of the vehicle structure.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3A is a schematic side view of the vehicle compatibility apparatus shown in FIG. 2A, employed on a vehicle undergoing an underride impact;

DESCRIPTION OF THE PREFERRED EMBODIMENTS

Figure 1:
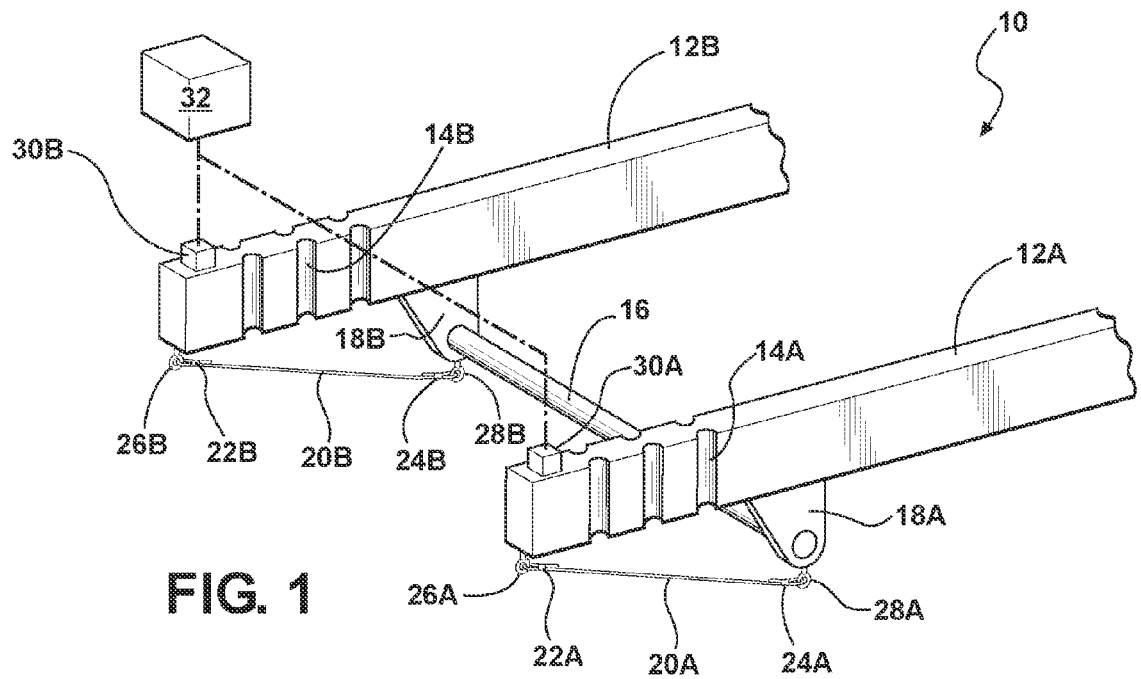
FIG. 1 is a schematic perspective view of a vehicle compatibility apparatus.

Referring to the drawings, wherein like reference numbers refer to like components, FIG. 1 shows a perspective view of a vehicle underride compatibility apparatus 10. As used herein, the term "underride" denotes a lower stance vehicle riding under a higher stance vehicle in the event of an impact. The term "compatibility" is used herein to indicate matching-up during impact event of vehicle structures having dissimilar elevation. The purpose of achieving such vehicle compatibility is to transfer collision energy, to elements of a vehicle's structure that were configured for its effective absorption.

The apparatus 10 includes frame rails 12A and 12B which are part of a vehicle frame. Frame rails 12A and 12B include energy absorption portions 14A and 14B. The energy absorption portions 14A and 14B are configured to provide energy absorption in the event of an impact, and are tuned corresponding to vehicle parameters, such as particular structure and weight. A vehicle compatibility beam 16 is mounted transverse to the frame, to the rear of the energy absorption portions 14A and 14B, on the frame rails 12A and 12B via brackets 18A and 18B. Beam 16 may be provided to supplement a structure of a higher stance vehicle as a rigid barrier for limiting underride. Flexible members 20A and 20B, have first ends 22A and 22B and second ends 24A and 24B. The flexible members 20A and 20B are arranged relative to the frame rails 12A and 12B, respectively, such that the energy absorption portions 14A and 14B are located between the first ends 22A and 22B and the second ends 24A and 24B. Flexible members 20A and 20B may be cables, chains, straps, or any other means of attachment that would be capable of transferring a tensile, but not a compressive load, i.e. means that would have considerable strength under tension, but become generally slack under compression. It is also conceivable that a particular application may utilize flexible members capable of supporting an insubstantial compressive load, i.e. a well under 50% fraction of the members' capacity to support a tensile load. First ends 22A and 22B of the flexible members are mounted and secured forward of the energy absorption portions 14A and 14B via fasteners 26A and 26B. Second ends 24A and 24B are secured at the brackets 18A and 18B via fasteners 28A and 28B (see FIG. 1).

Fasteners 26A, 26B, 28A and 28B may be of any type, such as, for example, a hook and eye arrangement, that would provide connection able reliably to withstand tensile loads likely to be experienced by the flexible member during a vehicle impact. Thus secured, the flexible members 20A and 20B are arranged to reduce displacement of the beam 16 away from the energy absorption portions 14A and 14B during an underride impact on the vehicle.

Figure 2A:
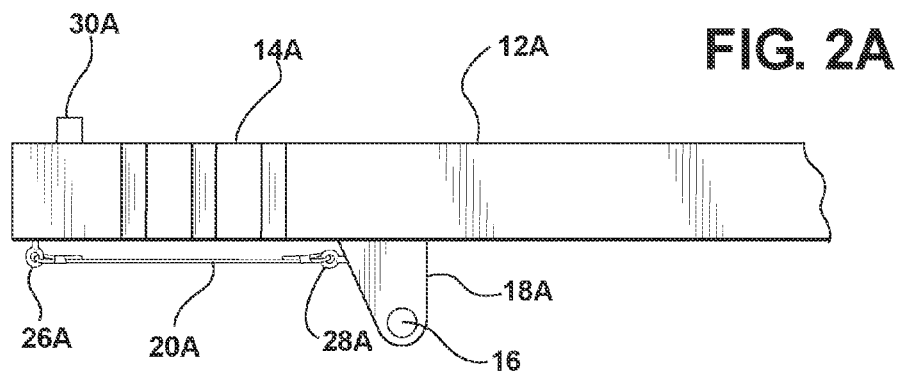
FIG. 2A is a schematic side elevational view of the vehicle compatibility apparatus shown in FIG. 1, with flexible members mounted substantially parallel to frame rails.
Figure 2B:
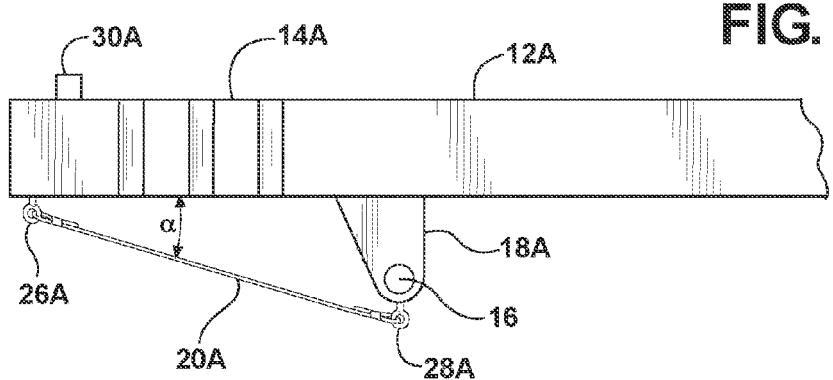
FIG. 2B is a schematic side elevational view of the vehicle compatibility apparatus shown in FIG. 1, with flexible members mounted at an angle to frame rails.

Flexible members 20A and 20B may be mounted either substantially parallel to the frame rails 12A and 12B, or at an angle to the frame rails (shown in FIGS. 2A and 2B). FIGS. 2A and 2B are representative of mounting positions for both the flexible member 20A and its complementary flexible member 20B. As shown in FIG. 2A, bracket 18A is positioned below the frame rail 12A, and the fastener 28A is positioned on the bracket above the compatibility beam 16, but below the frame rail 12A. Additionally, the fastener 28A is positioned substantially on the same level as fastener 26A with respect to the energy absorption portion 14A. The first end 22A is therefore positioned substantially at the same height as the second end 24A. Such mounting of the first and second ends positions each flexible member substantially parallel relative to the respective frame rail (see FIG. 2A).

As shown in FIG. 2B, bracket 18A is positioned below the frame rail 12A, and the fastener 28A is positioned on the bracket below the compatibility beam 16. Because the first end 22A is therefore positioned above the second end 24A at the bracket 18A, such mounting of the first and second ends positions the flexible member 20A at angle α with respect to the energy absorption portion 14A (see FIG. 2B). Generally, however, each flexible member is to be mounted sufficiently with respect to a corresponding rail in order to distribute the impact energy between the energy absorption portions and the beam when the flexible member is loaded in tension during an underride impact.

Generally, due to the positioning of each flexible member, upon underride impact, the flexible members 20A and 20B may also cause the energy absorption portions 14A and 14B to deflect downward (not shown), toward the underriding vehicle. Such deflection of the energy absorption portions will further reduce the underride of the higher stance vehicle by a lower stance vehicle. Overall, the configuration of the underride compatibility apparatus 10 prevents a complete underride of the higher stance vehicle by a lower stance vehicle. Although the underride compatibility apparatus 10 is shown positioned at the front of a vehicle, the nature and function of the apparatus permits it to be positioned at the front and/or at the rear end of a vehicle.

In modern vehicles, a variety of structures (not shown) attached to the frame may be utilized for locating sensors 30A and 30B for various occupant protection systems, such as air bags. Sensors 30A and 30B are typically positioned relative to the frame rails 12A and 12B, respectively, for sensing and transmitting impact data signals to a controller 32 (see FIG. 1). The controller 32 utilizes the signal as input to a sensing algorithm for controlling the occupant protection system's operation, e.g. air bag deployment. Because of the sensors' positioning, impact energy absorption characteristics of the energy absorption portions are highly significant to the calibration, i.e. tuning, of the sensing algorithm. As such, an algorithm developed for controlling an occupant protection system is typically calibrated to a specific vehicle structure. Furthermore, a vehicle so equipped generally undergoes extensive dedicated testing to validate its frame and occupant protection system performance. Consequently, significant changes to the energy absorption portions' impact energy absorption characteristics may affect sensor timing and actuation of the occupant protection system, thus requiring retesting and subsequent changes to the algorithm.

Figure 3B:
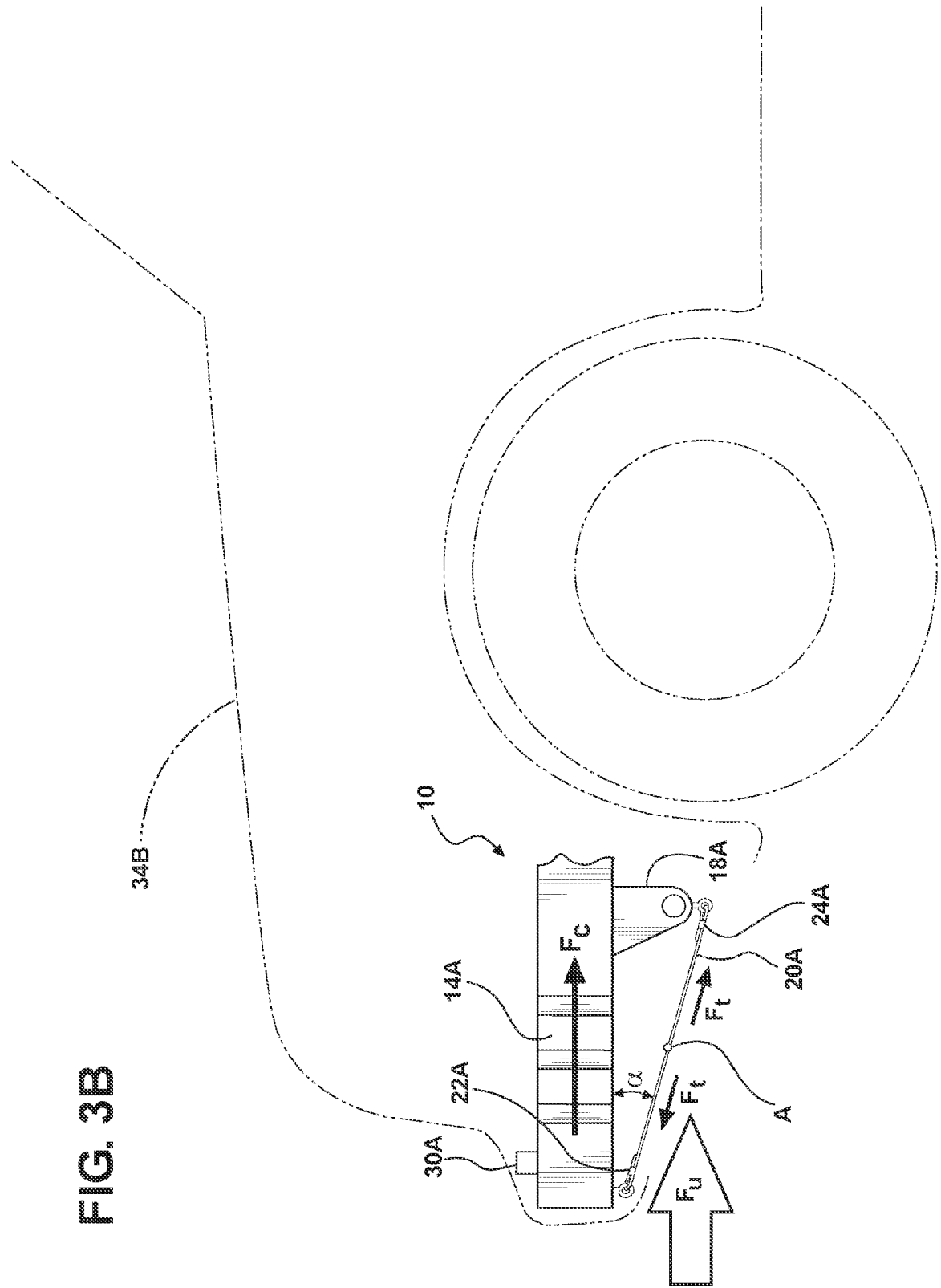
FIG. 3B is a schematic side view of the vehicle compatibility apparatus shown in FIG. 2B, employed on a vehicle undergoing an underride impact.
Figure 4:
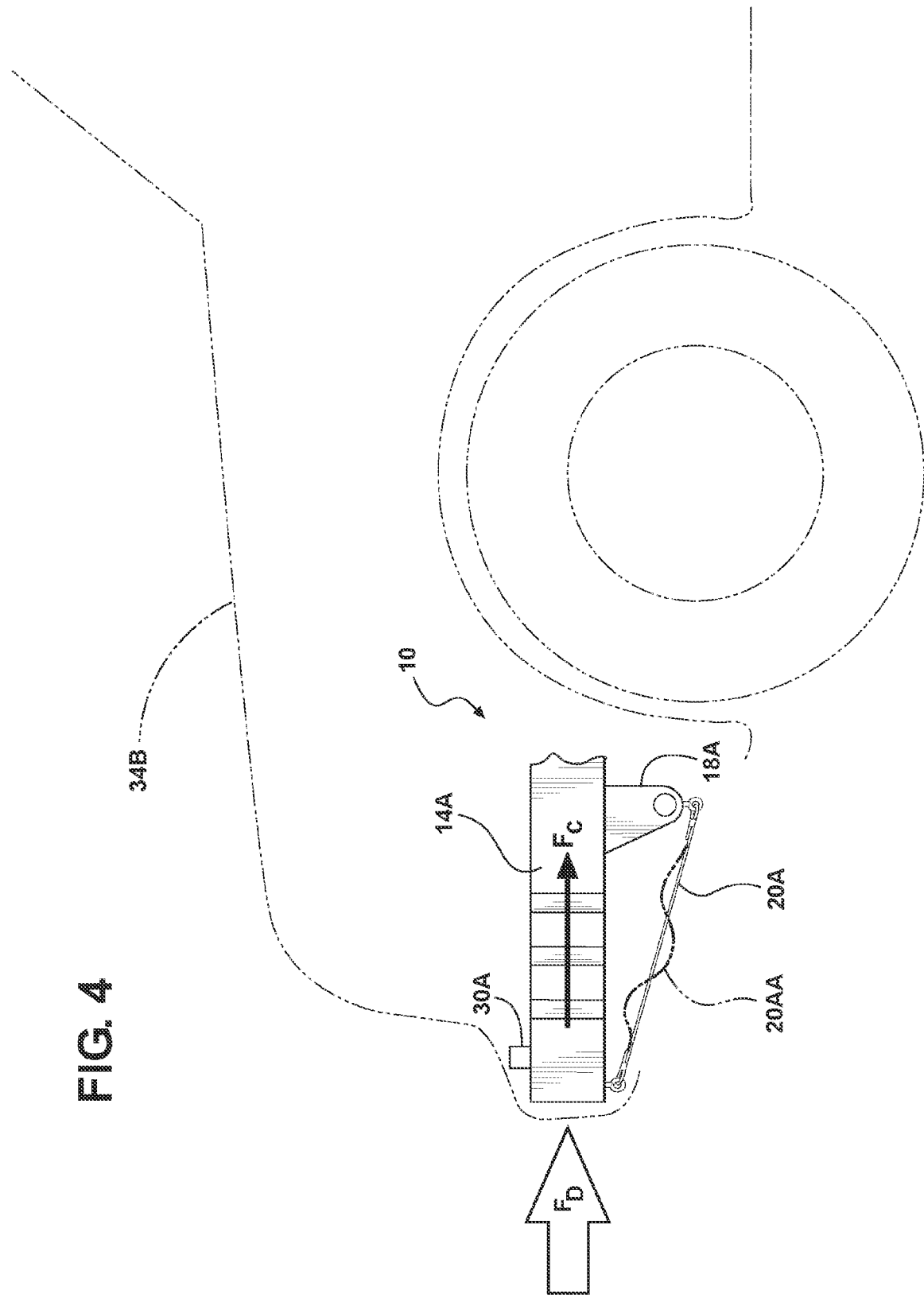
FIG. 4 is a schematic side view of the vehicle compatibility apparatus employed on a vehicle undergoing a direct impact.

FIGS. 3A, 3B and 4 schematically illustrate a vehicle equipped with the underride apparatus 10 subjected to impact forces. Vehicle 34A, as shown in FIG. 3A, and vehicle 34B, as shown in FIGS. 3B and 4, may represent either a front or a rear end of a vehicle. FIGS. 3A and 3B show a schematic illustration of an underride impact force $F_U$, as a load on the vehicle 34A equipped with the apparatus 10 by a lower stance vehicle (not shown). In the event of underride impact on the vehicle 34A, where the flexible member 20A is mounted substantially parallel to the frame rail 12A, the principal contact between a lower stance vehicle and the vehicle compatibility apparatus 10 is intended to occur at the beam 16 (see FIG. 3A). In such an instance, the beam 16 will bear the entire underride impact force $F_U$. To the extent beam 16 is displaced due to the influence of the underride impact force $F_U$, the beam will generate a tensile force $F_T$ in the flexible member 20A, thus transferring the impact force to the energy absorption portion 14A.

Where the flexible member 20A is positioned at angle α with respect to the respective frame rail 12A, as shown in FIG. 3B, the initial contact may, however, occur at the flexible member. Such contact will generate an underride impact force $F_U$ at point A on the flexible member 20A, in the span between the respective first end 22A and the second end 24A (see FIG. 1). In such instance, the underride impact force $F_U$ will tend to load the flexible member in tension via force $F_T$, thereby distributing the impact force between the energy absorption portion 14A and the beam 16 via the bracket 18A.

The flexible member 20A, whether positioned substantially parallel or at angle α with respect to the respective frame rail 12A, will apply a compressive force $F_C$ to the energy absorption portion 14A (see FIGS. 3A and 3B). Although not shown, as a result of the underride impact force $F_U$ on vehicle 34A (FIG. 3A) or on vehicle 34B (FIG. 3B), the complementary, i.e. similarly positioned, energy absorption portion 14B (shown in FIG. 1) will experience comparable loading via the flexible member 20B. Hence, as seen by the energy absorption portions 14A and 14B, force $F_C$ is analogous to the type of loading the energy absorption portions may experience during a direct impact (shown in FIG. 4 and described below) via, for example, a like stance vehicle.

FIG. 4 shows a side view of the vehicle compatibility apparatus 10 employed on a vehicle 34B undergoing a direct impact. As described above, the flexible members 20A and 20B (as shown in FIG. 1) are only capable of carrying a tensile load, not a compressive one. Therefore, in the event of a direct impact force $F_D$ on the energy absorption portion 14A, i.e. an impact with a like stance vehicle or with any other object presenting direct contact with the energy absorption portions, the flexible member 20A will tend to go slack, as depicted by element 20AA in FIG. 4. Correspondingly, as a result of the direct impact force $F_D$ on the energy absorption portion 14B, the flexible member 20B (as shown in FIG. 1) will similarly tend to go slack (not shown). Hence, on a vehicle equipped with the underride compatibility apparatus 10, the direct impact force $F_D$ will nevertheless be channeled primarily through the energy absorption portions, subjecting them to compressive force $F_C$. Consequently, the energy absorption characteristics of the energy absorption portion 14A will remain unaltered, allowing the signal received by the actuation sensors to be essentially unchanged from a corresponding signal from the same structure without the compatibility apparatus. Although not shown, vehicle 34A undergoing a direct impact would similarly see direct impact force $F_D$ channeled primarily through the energy absorption portions, thereby subjecting them to a similar compressive force $F_C$.

While the best modes for carrying out the invention have been described in detail, those familiar with the art to which this invention relates will recognize various alternative designs and embodiments for practicing the invention within the scope of the appended claims.

The invention claimed is:

1. An underride compatibility apparatus for a vehicle structure comprising:
    a frame arranged to support the vehicle structure, the frame having an energy absorption portion arranged for absorption of impact energy;
    a beam arranged substantially transverse to the vehicle structure, below the frame, and remote from the energy absorption portion; and
    a flexible member configured to carry a tensile load, but not a substantial compressive load, having a first end arranged on the frame and a second end arranged on the beam, wherein the energy absorption portion is arranged between the first end and the second end;
    wherein the flexible member is configured sufficiently with respect to the frame for distributing the impact energy between the energy absorption portion and the beam when the flexible member is loaded in tension during an underride impact on the vehicle, without affecting the impact energy absorption of the energy absorption portion during a direct impact on the vehicle.

2. The underride compatibility apparatus of claim 1, wherein the flexible member is arranged to reduce displacement of the beam during the underride impact on the vehicle.

3. The underride compatibility apparatus of claim 1, wherein the first end of the flexible member is arranged above the second end.

4. The underride compatibility apparatus of claim 1, wherein the flexible member is arranged substantially parallel to the energy absorption portion above the beam but below the frame.

5. The underride compatibility apparatus of claim 1, wherein the flexible member is one of a cable, a chain, and a strap.

6. The underride compatibility apparatus of claim 1, wherein the leading portion is arranged at the front of the vehicle structure.

7. The underride compatibility apparatus of claim 1, wherein the leading portion is arranged at the rear of the vehicle structure.

8. A vehicle comprising:
    a frame arranged to support a vehicle structure, wherein the frame includes an energy absorption portion for absorption of impact energy;
    a beam arranged substantially transverse to the vehicle structure, below the frame, and remote from the energy absorption portion; and
    a flexible member configured to carry a tensile load, but not a compressive load, having a first end arranged on the frame and a second end arranged on the beam, wherein the energy absorption portion is arranged between the first end and the second end;
    wherein the flexible member is configured sufficiently with respect to the frame for distributing the impact energy between the energy absorption portion and the beam when the flexible member is loaded in tension during an underride impact on the vehicle, without affecting the impact energy absorption of the energy absorption portion during a direct impact on the vehicle.

9. The vehicle of claim 8, wherein the flexible member is arranged to reduce displacement of the beam during an underride impact on the vehicle.

10. The vehicle of claim 8, wherein the first end of the flexible member is arranged above the second end.

11. The vehicle of claim 8, wherein the flexible member is arranged substantially parallel to the energy absorption portion above the beam but below the frame.

12. The vehicle of claim 8, wherein the flexible member is a cable, a chain, or a strap.

13. The vehicle of claim 8, wherein the energy absorption portion is arranged at the front of the vehicle structure.

14. The vehicle of claim 8, wherein the energy absorption portion is arranged at the rear of the vehicle structure.

* * * * *